Sept. 26, 1939.  R. A. SHIELDS  2,174,354
TANK SIPHON SUPPORT
Filed July 6, 1936
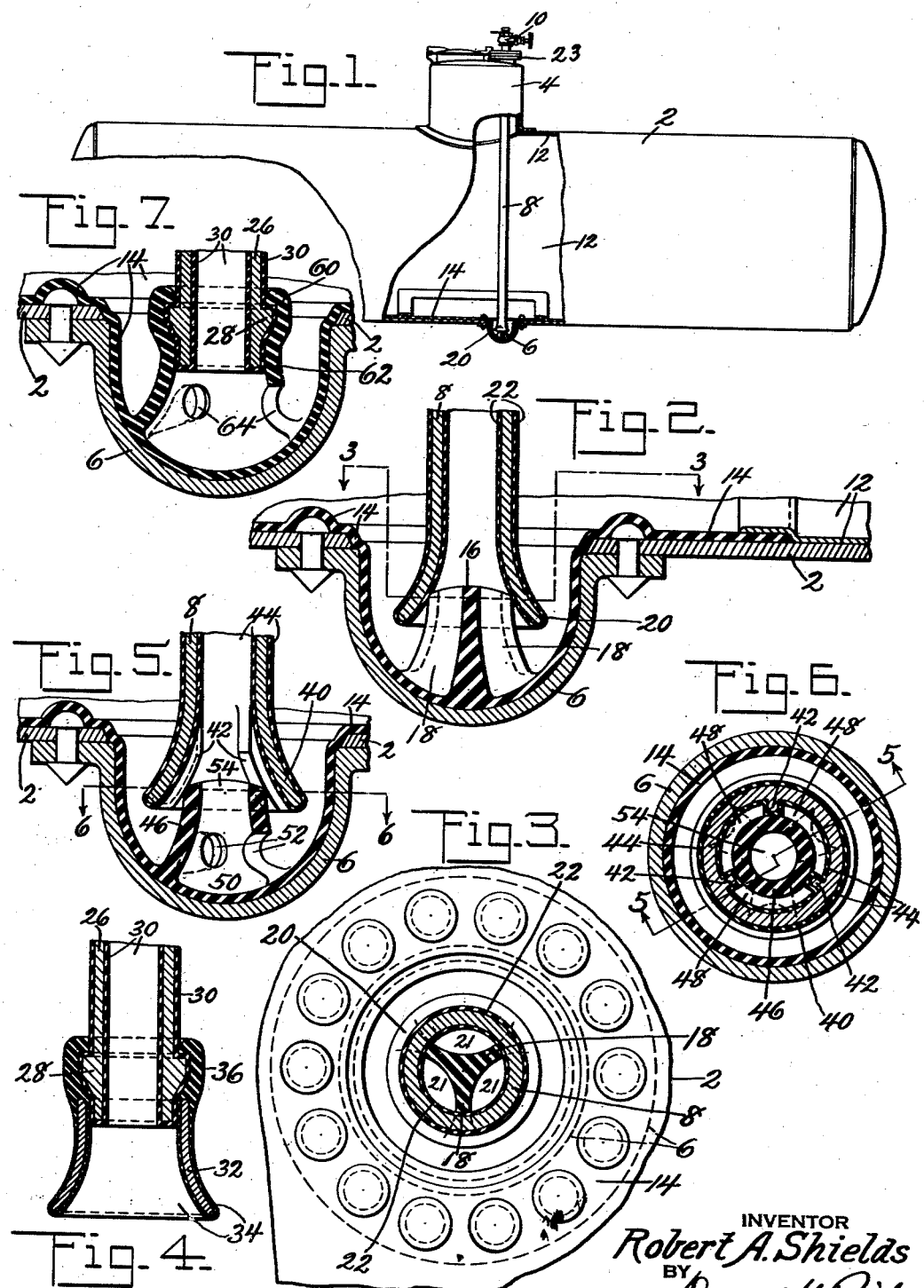
INVENTOR
Robert A. Shields
BY
ATTORNEY Patented Sept. 26, 1939

2,174,354

UNITED STATES PATENT OFFICE 2,174,354

TANK SIPHON SUPPORT

Robert A. Shields, Berwick, Pa., assignor to American Car and Foundry Company, New York, N. Y., a corporation of New Jersey Application July 6, 1936, Serial No. 89,151

12 Claims. (Cl. 220—85)

This invention relates to supports for pipes in general and in particular to siphon pipes for use in lined tanks adapted for the conveyance of corrosive or readily tainted liquids.

Previous siphon pipes have been supported and braced at the bottom by means of rubber or other resilient plugs within which the pipe fitted. These plugs were formed with numerous passages and the entire plug needed to be cemented or vulcanized to the heavy wear sheet required at the portion of the vessel adjacent the pipe. Such formation of the plugs required dies which were extremely expensive and there was the added expense of securing the plug in place. It is an object, therefore, of this invention to provide a siphon pipe support which may be formed as a part of the wear pad and without the use of expensive dies.

Another object of the invention is the provision of a wear pad and siphon pipe support which may be vulcanized to the vessel as a unit.

A further object of the invention is the provision of a siphon pipe support in which the liquid flow into the pipe is along regular uninterrupted lines of flow.

A still further object of the invention is the provision of a siphon pipe support which may be readily cleaned of any foreign matter.

These and other objects of the invention will be apparent to one skilled in the art from a study of the following description and accompanying drawing, in which:

Figure 1 is a broken side view of a tank or vessel showing the conventional placement of the pipe in a vessel or tank;

Fig. 2 is an enlarged sectional view of the siphon pipe and bowl shown in Fig. 1;

Fig. 3 is a sectional view taken on line 3—3 of Fig. 2;

Fig. 4 is a sectional view of a slightly modified form of siphon pipe;

Fig. 5 is a sectional view of a modified form of a siphon pipe and bowl and taken on line 5—5 of Fig. 6;

Fig. 6 is a sectional view of the modified siphon pipe and bowl of Fig. 5 and taken on line 6—6 of Fig. 5, and Fig. 7 is an enlarged sectional view of a still further modification of the siphon pipe and bowl.

Referring now to the drawing in detail it is seen that the typical tank or vessel shell 2 is provided with dome 4, siphon bowl or sump 6 and siphon pipe 8 controlled by valve 10. The tank shell is lined with the usual relatively thin rubber lining 12 to which is joined, as required by shipping regulations, the heavy rubber pad 14 which is placed at the siphon bowl or sump and beneath the dome and permits the entrance of men into the tank without danger of injuring the tank lining. In the form shown in Figs. 1, 2 and 3 a projection 16 having radiating ribs 18 is formed integral with the central portion of the pad and extends upwardly from the central portion of the siphon bowl when the pad is vulcanized in place within the tank.

The projecting ribs are adapted to engage the end of the siphon pipe which is formed with a bell-mouth 20 completely covered inside and out, by rubber coating or lining 22 also which covers and protects the entire siphon pipe. The bell-mouth is made of such a size and is adapted to contact the ribs at a portion such that the sum of the areas 21 inclosed by the ribs and bell-mouth is substantially equal to the area of the siphon pipe. The bell-mouth is of such a diameter as to be readily removable through the securing opening 23 in the dome and to be readily insertable over the projection on to which it is guided by the flared bell-mouth. It is seen that the liquid to be siphoned from the vessel may flow downwardly over the entire bowl area then curve upwardly into the siphon pipe without being hindered by any sharp bends or restricted passages. It is also obvious that with the siphon pipe removed the bowl may be completely cleaned for every part of the bowl and the projection is fully exposed.

The form shown in Fig. 4 is but a slight modification of the siphon pipe shown in Fig. 2 and is intended for use where the securing opening 23 is too small to permit ready removal of the siphon pipe. In this form the siphon pipe 26 is formed with an enlargement 28 which, together with the entire inner and outer surface of the siphon pipe, is covered by lining or coating 30. The bell-mouth is formed by a tapering metal member 32 covered by rubber coating 34 formed integral with rubber top-portion 36 which is of relatively elastic rubber that may be snapped over the rubber covered enlargement of the siphon pipe. A bell-mouth is thus provided that may be readily removed for replacement or for substitution of a different size mouth.

The form shown in Figs. 5 and 6 is a slight modification of that shown in Fig. 2 and in this form the bell-mouth 40 is formed on the interior with projecting ribs 42 which, together with the inner and outer surfaces of the mouth, are covered by rubber coating 44. The bell-mouth ribs are intended to contact circular projection 46 formed integral with the wear pad and thus steady the pipe and provide a plurality of openings 48 through which liquid may pass. The openings 48 may be sufficient but it is preferred that the projection be made hollow as shown to provide cavity 50 into which liquid may flow through openings 52 and out of which the liquid may flow through neck opening 54 into the siphon pipe to join the flow of liquid through openings 48. In this form as in the other the liquid flow is along smooth and uninterrupted lines and the parts may be readily cleaned since the neck opening 54 is of considerable extent.

Fig. 7 discloses a further modification and in this modification the siphon pipe is formed in the same manner as described in connection with Fig. 4 and the same reference numerals have been used. The enlargement 28, however, is adapted to be resiliently gripped by the upper portion 60 of a circular hollow projection 62 formed integral with the wear pad and provided with openings 64 through which liquid may flow into the large hollow space and thence into the siphon pipe. The siphon pipe may be readily removed from or inserted in the projection in the same manner as the bell-mouth of Fig. 4 may be attached to or removed from the siphon pipe.

While the invention has been described more or less in detail, it is obvious that various improvements will suggest themselves, such as making the projections of metal to be coated with rubber in cases where added stiffness is desired, but all such improvements are contemplated as fall within the scope of the following claims.

What is claimed is:

1. In combination, a tank formed with a sump, an upwardly extending projection within the sump and in spaced relation to the walls thereof, a siphon pipe supported by the tank, a bell-mouth at one end of the pipe, said bell-mouth being engageable over said projection to guide the pipe to a substantially centered position the sump and to provide lateral support for the siphon pipe, and rib means spacing said bell-mouth from said projection to provide passages for the transfer of liquid between the sump and the siphon pipe.

2. In combination, a tank formed with a sump, a rubber pad secured to the sump, a ribbed projection formed on said pad and projecting upwardly within the sump, a siphon pipe supported by the tank, a bell-mouth at one end of the pipe, said bell-mouth engaging over said ribbed projection to provide lateral support for the siphon pipe and spaces for the passage of liquid.

3. In combination, a tank formed with a sump, an upwardly extending projection secured to the sump, a plurality of ribs on said projection, a siphon pipe supported by the tank, a bell-mouth at one end of the pipe, said bell-mouth engaging said ribs to provide lateral support for the siphon pipe and spaces for the passage of liquid.

4. In combination, a tank formed with a sump, an upwardly extending hollow projection secured to the tank within the sump, a plurality of openings through the walls of the projection, a siphon pipe supported by the tank, a bell-mouth at one end of the pipe, said bell-mouth engaging said hollow projection to provide lateral support for the siphon pipe and said openings permitting passage of liquid from the sump to the siphon pipe.

5. In combination, a tank formed with a sump, an upwardly extending hollow projection secured to the tank within the sump, a plurality of openings through the walls of the projection, a siphon pipe supported by the tank, a bell-mouth at one end of the pipe, said bell-mouth being formed with inwardly projecting ribs, adapted to engage said hollow projection to provide lateral support for the siphon pipe, said ribs and openings providing passages for the transfer of liquid from the sump to the siphon pipe.

6. In combination, a tank formed with a sump, an upwardly extending projection means within the sump and substantially fixed relative thereto, a siphon pipe supported by the tank, a removable bell-mouth means carried at one end of said pipe, said removable bell-mouth means engaging said projection means to provide lateral support for the siphon pipe, and passages formed in at least one of said means for the transfer of liquid between the sump and the siphon pipe.

7. In combination, a tank formed with a sump, an upwardly extending projection member within the sump and substantially fixed relative thereto, a siphon pipe supported by the tank, an enlargement formed on said pipe at one end thereof, a bell-mouth member, resilient means secured to said bell-mouth member and adapted to removably engage said enlargement, and said bell-mouth member engaging said projection member to provide lateral support for the siphon pipe, and at least one of said members being formed with means providing passages for the transfer of liquid between the sump and siphon pipe.

8. In a tank having a sump in the base thereof, a projecting member positioned substantially in the center of the sump and substantially fixed relative thereto, ribs formed on said member, a siphon pipe engaging over said ribs to provide unobstructed clearance space between the sump walls and the pipe and also provide unobstructed passages between the projecting member and the pipe.

9. In combination, a tank formed with a sump, an upwardly extending projection means secured to the tank within the sump, a siphon pipe supported by the tank, a bell-mouth means at one end of the pipe and engaging said projection means to substantially center the pipe within the sump, at least one of said means being formed with ribs to provide lateral support for the siphon pipe and at the same time spaces for the passage of liquid.

10. In combination, a tank formed with a sump, an upwardly extending cone-shaped projection secured to the tank within the sump, a siphon pipe supported in its lowered position by the tank, a bell-mouth at one end of the pipe and engageable over said cone-shaped projection whereby said pipe will be guided during lowering to a substantially centered position within the sump, said projection being ribbed to provide passages for the transfer of liquid between the sump and pipe interior.

11. In combination, a tank formed with a sump, an upwardly extending cone-shaped projection secured to the tank within the sump, a siphon pipe supported in its lowered position by the tank, a bell-mouth at one end of the pipe and engagable over said cone-shaped projection whereby said pipe will be guided during lowering to a substantially centered position within the sump, said projection being formed with openings providing passages for the transfer of liquid between the sump and pipe interior.

12. In combination, a tank formed with a sump, an upwardly extending cone-shaped projection means secured to the tank within the sump, a siphon pipe supported in its lowered position by the tank, a bell-mouth means at one end of the pipe and engageable over said cone-shaped projection means whereby said pipe will be guided during lowering to a substantially centered position within the sump, at least one of said means being formed with ribs to provide lateral support for the siphon pipe and at the same time spaces for the discharge of liquid.

ROBERT A. SHIELDS.